Patented Sept. 15, 1942

2,296,081

UNITED STATES PATENT OFFICE 2,296,081

LUBRICATION OF ROTARY VALVES

Frank Metcalf Aspin, Bury, England

Application December 28, 1940, Serial No. 372,063
In Great Britain December 9, 1939

8 Claims. (Cl. 251—93)

This invention relates to the lubrication of rotary valves and is particularly applicable to rotary valves for internal combustion engines of the kind described in the specifications of applicant's copending applications 89,115, filed July 6, 1936, now Patent 2,283,594 granted May 19, 1942, and 258,224, filed Feb. 24, 1939, now Patent 2,245,743, granted June 14, 1941, though not limited to such application.

One of the main problems with rotary valves is their lubrication to obtain at the same time efficient and economical lubrication. This problem is inherent in the design of any rotary valve because a substantial portion of the valve surface which has to be lubricated to provide a bearing surface or gas seal, also has to pass the port or ports where loss of lubricant may occur.

The object of the invention is an improved method of and means for lubricating a rotary valve both efficiently and economically.

The invention comprises the method of lubrication of a rotary valve wherein an oil film is maintained between the co-acting bearing or gas-sealing surfaces of the valve member and its ported seating and wherein part, at least, of such oil film is diverted from that part of the surface of the rotary valve member where and before it passes the port or ports.

According to the invention, means are provided for establishing an oil film at the co-acting bearing or gas-sealing surfaces of the rotary valve member and its seating in combination with means, adjacent to the port or ports in the valve seating, for removing at least a substantial part of the oil film from that part of the surface of the rotary valve member where and before it passes the port for re-establishing the oil film thereon immediately after passing the port.

The accompanying drawings illustrate one example of the invention, in which

Figure 1:
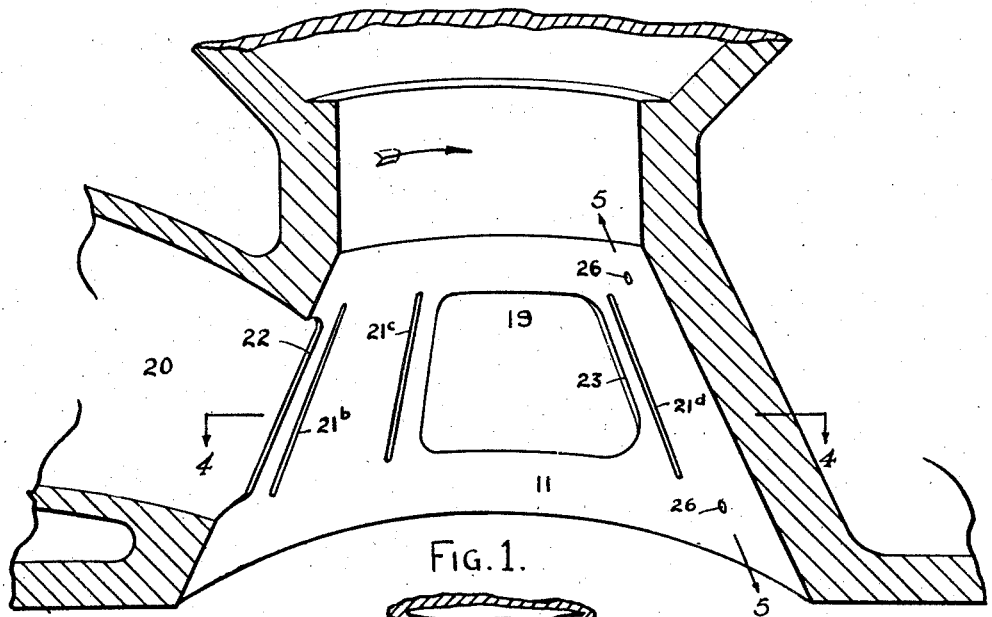
Fig. 1 is a perspective axial section of the valve housing.
Figure 2:
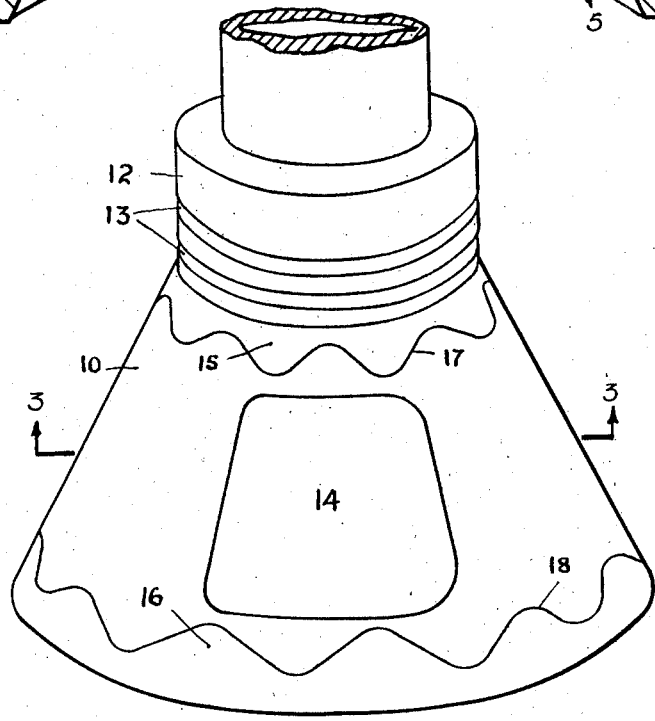
Fig. 2 is a perspective view of the lower part of the rotary valve member.
Figure 3:
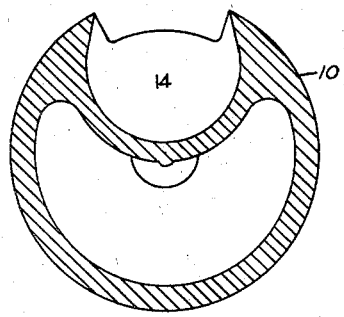
Fig. 3 is a cross section on line 3—3 of Fig. 2.

In the example of the invention illustrated in the drawings, a rotary valve member and its housing constructed in accordance with the specification of the applicant's U. S. Patent No. 2,283,594, the valve member has a conical peripheral face 10 seating directly in a conical face 11 in the housing. These coacting faces may, if of suitable material and proportions, form the bearing taking the whole of the thrust load on the valve member. On the other hand, supplementary anti-friction thrust bearings may be provided in accordance with the U. S. Patent No. 2,245,743.

The rotary valve member, at its smaller conical end, merges into a cylindrical shaft or extension 12 in which are formed two piston ring grooves 13, the duty of which rings is to retain any oil film on the conical surfaces and to prevent such oil from escaping up the valve shaft 12. The tapered face 10 of the valve member is longer than the depth of the port 14 of the valve by a suitable amount necessary to provide a bearing and gas seal, and in the particular example herewith described such face 10 is in all approximately 3⅝ inches long measured down its sloping face, whilst the port 14 is of such depth as to leave a conical portion at 15 of about ½ inch length above the port and of about $\frac{9}{16}$ inch length at 16 below the port, i. e. at the larger diameter of the valve member.

Wavy oil grooves 17 and 18 are formed on the face 10 of the rotary member in the centre of these continuous conical portions, the amplitude of the wave being approximately half the length of the conical space. The pitch of the upper wavy groove 17 is about ¾ inch, whilst that of the lower wavy groove 18 is about 1½ inches. These grooves are only shallow and may conveniently be formed by cam turning. The proportion of the groove is therefore such that it sweeps an area approximately half the complementary continuous bearing surface area of the housing beyond the ends of the port.

Figure 4:
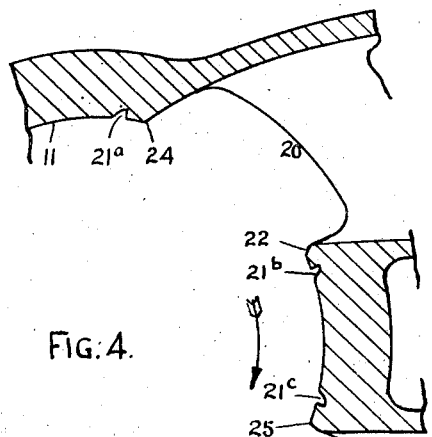
Fig. 4 is a cross section on line 4—4 of Fig. 1.

The valve housing has two ports, see Fig. 4, one 19 for the inlet and the other 20 for the outlet. Four oil grooves, 21a, 21b, 21c and 21d (see Figs. 1 and 4) are formed in the conical face of the seating on each side of the ports and extending into the vicinity of the region supplied by the wavy oil grooves 17 and 18 in the rotary member. These grooves 21a, 21b, 21c and 21d are spaced a short distance away from the port side say about ⅛ inch, and are shaped so that their edges immediately adjacent to the ports are sharp and radial or normal to the surface whilst their other edges away from the ports are sloped or bevelled. The arrow shows the direction of rotation of the rotary member. The trailing edges 22 and 23 of the ports are rounded off (see Fig. 4) whilst the leading edges 24 and 25 are preferably angular as shown.

Figure 5:
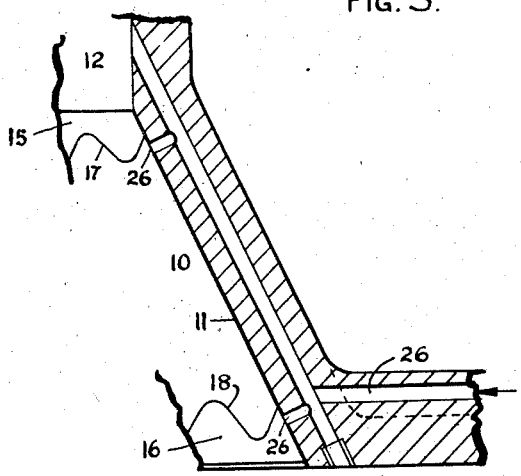
Fig. 5 is a part section on line 5—5 of Fig. 1.

Oil ducts 26 (see Figs. 4 and 5) are provided in the wall of the housing in the vicinity of the wavy grooves on the rotary member, and to which oil is fed under low pressure to reach the said wavy grooves.

In operation, the oil supplied under low pressure to the ducts 26, in the housing is picked up by the wavy grooves and distributed effectively over the continuous conical portions 15 and 16 respectively above and below the port. The oil also spreads from such area into the grooves on each side of the ports and is particularly carried to the groove 21a on the far side of the port. The oil fills the full length of the groove and spreads therefrom to the intervening conical portion of the co-acting conical surfaces assisted by the shaping or inclining of the back edge of the groove. When such oil film reaches the grooves 21a and 21c in front of the ports a substantial part of the film is "scraped" from the rotary member by the combined action of the reverse action and the sharp facing edge of such groove, and is led by such groove to the ends where it supplements the oil film and passes round the upper and lower ends of the port from where it enters the ends of the next groove beyond the port and spreads along the same, filling it and spreading out therefrom by groove action to cover the intervening conical portion of the rotary member.

Figure 6:
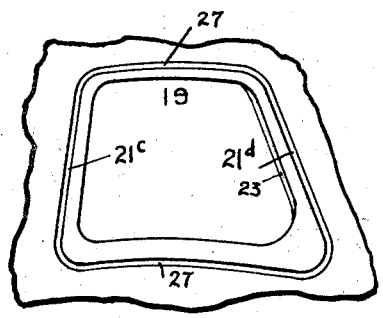
Figs. 6 and 7 show modifications of the invention.

Communicating grooves 27 (see Fig. 6) may be provided in the housing joining the ends of the side grooves 21c and 21d arranged above and below the port so as to help carry the oil round the port as above described.

Figure 7:
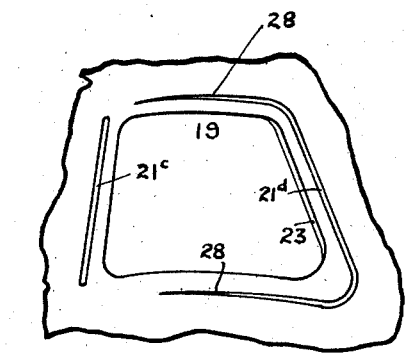

As shown in Fig. 7 additional grooves 28 are provided in the housing as an extension of the ends of the leading side groove 21d to the areas above and below the port so that they fade out gradually in such areas and thus operate directly to increase the oil film supply pressure in such areas.

The side grooves 21a, 21b, 21c and 21d in the housing may be straight down the inclined face parallel with the sides of the ports as shown in Fig. 1 or may be curved or inclined and there may be two or more grooves relatively close together as may be found to be desirable. The combination of the effectively lubricated zones above and below the ports and particularly below the ports and the distributing grooves at the sides of the ports can be used effectively to maintain lubrication for the whole co-acting conical bearing surfaces with very little loss at the ports, an effect hitherto unobtainable. Lubrication of the end portions of the conical bearing surfaces and particularly the lower portion which is a danger zone can always be effectively maintained at the same time. Incidentally, it has been found that the collection of carbon in the lubricating grooves does not prejudice or does not in practice occur to such an extent as to prejudice the efficient operation of the improved system of lubrication.

The invention is obviously not limited to all the details of construction of the example above described as the same may be modified without departing from the nature of the invention. For example, lubricant holding grooves may be provided in the valve housing instead of, or in addition to the grooves 17 and 18 in the rotary valve member and such grooves may be similarly wavy and continuous.

What I claim is:

1. A valve comprising a valve housing forming a socket, a plug rotating in the socket, said socket and plug having lubricated complementary engaging surfaces with complementary ports therein forming in such surfaces zones disposed in the direction of rotation, said zones respectively being interrupted and uninterrupted by said ports, means for continuously lubricating said surface zones not interrupted by the ports, said interrupted surface zone of the socket having a groove formation arranged across the direction of relative movement of the plug surface and with a relatively vertical wall facing the lubricant carried on the approaching surface of the plug and a relatively inclined wall down which the lubricant can spread as it enters the groove formation, whereby said groove formation is adapted to interrupt some part of the lubricant on that portion of the plug immediately before such lubricant reaches the port in the socket.

2. A valve comprising a valve housing forming a socket, a plug rotating in the socket, said socket and plug having lubricated complementary engaging surfaces with complementary ports therein forming zones in such surfaces disposed in the direction of rotation, said surfaces respectively being interrupted and uninterrupted by said ports, means for continuously lubricating said surface zones not interrupted by the ports, said socket having in its interrupted surface zone a groove formation arranged across the direction of relative movement of the plug surface and with a relatively vertical wall facing the lubricant carried on the approaching surface of the plug and a relatively inclined wall down which the lubricant can spread as it enters the groove formation, whereby said groove formation is adapted to interrupt some part of the lubricant on that portion of the plug immediately before such lubricant reaches the port in the socket and said socket being provided with a further groove formation to restore the interrupted lubrication immediately beyond the port in the socket.

3. A valve comprising a valve housing forming a socket, a plug rotating in the socket, said socket and plug having lubricated complementary engaging surfaces with complementary ports therein forming zones in said surfaces disposed in the direction of rotation, said zones respectively being interrupted and uninterrupted by said ports, means for continuously lubricating said surface zones not interrupted by the ports, said socket having in its interrupted surface zone a groove formation arranged across the direction of relative movement of the plug surface and with a relatively vertical wall facing the lubricant carried on the approaching surface of the plug and a relatively inclined wall down which the lubricant can spread as it enters the groove formation, whereby said groove formation is adapted to interrupt some part of the lubricant on that portion of the plug immediately before such lubricant reaches the port in the socket, said socket having a further groove formation arranged to restore the interrupted lubrication immediately beyond the port in the socket, said further groove formation having relatively vertical and inclined walls similar to the first named groove formation but oppositely directed.

4. A valve comprising a valve housing forming a socket, a plug rotating in the socket, said socket and plug having lubricated complementary engaging surfaces with complementary ports therein forming zones in such surfaces disposed in the direction of rotation, said zones respectively being interrupted and uninterrupted by said ports, means for continuously lubricating said surface zones not interrupted by the ports, said socket having in its interrupted surface zone a groove formation arranged across the direction of relative movement of plug surface and with a relatively vertical wall facing the lubricant carried on the approaching surface of the plug and a relatively inclined wall down which the lubricant can spread as it enters the groove formation, whereby such groove formation is adapted to interrupt some part of the lubricant on that portion of the plug immediately before such lubricant reaches the port in the socket and said socket being provided with a further groove formation to restore the interrupted lubrication immediately beyond the port in the socket and having inclined walls similar to the first named groove formation but oppositely directed and extending into said interrupted zone of the surface of the socket.

5. A valve comprising a valve housing forming a socket, a plug rotating in the socket, said socket and plug having lubricated complementary engaging surfaces with complementary ports therein forming zones in said surfaces disposed in the direction of rotation and said zones respectively being interrupted and uninterrupted by said ports, means for continuously lubricating the said surface zones not interrupted by the ports and said socket having a groove formation in its interrupted surface zone arranged across the direction of relative movement of the plug surface and with a relatively vertical wall facing the lubricant carried on the approaching surface of the plug and a relatively inclined wall down which the lubricant can spread as it enters the groove formation, whereby such groove formation is adapted to interrupt some part of the lubricant on that portion of the plug immediately before such lubricant reaches the port in the socket and said socket being provided with a further groove formation to restore the interrupted lubrication immediately beyond the port in the socket, said further groove formation having inclined walls similar to the first named groove formation but oppositely directed, extending into said uninterrupted zone of the surface of the socket in the direction of the rotation of the plug surface.

6. A valve comprising a valve housing forming a socket, a plug rotating in the socket, said socket and plug having lubricated complementary engaging surfaces with complementary ports therein forming zones in such surfaces disposed in the direction of rotation, said zones respectively being interrupted and uninterrupted by said ports, means for continuously lubricating said surface zones not interrupted by the ports and said socket being provided in its interrupted surface zone with a groove formation arranged across the direction of relative movement of the plug surface and with a relatively vertical wall facing the lubricant carried on the approaching surface of the plug and a relatively inclined wall down which the lubricant can spread as it enters the groove formation, whereby said groove formation is adapted to interrupt some part of the lubricant on that portion of the plug immediately before such lubricant reaches the port in the socket and said socket being provided with a further groove formation to restore the interrupted lubrication immediately beyond the ports in the socket, said further groove formation having inclined walls similar to the first named groove formation but oppositely directed and extending into said interrupted zone of the surface of the socket in the direction of rotation of the plug surface, said last named directional portion of the groove formation tapering towards its ends.

7. A valve comprising a valve housing having a socket, a plug rotating in the socket, said socket and plug having lubricated complementary engaging surfaces with complementary ports therein forming zones in such surfaces disposed in the direction of rotation, said zones respectively being interrupted and uninterrupted by said ports, means for continuously lubricating said surface zones not interrupted by the ports, said socket being provided in its interrupted surface zone with a groove formation arranged across the direction of relative movement of the plug surface and with a relatively vertical wall facing the lubricant carried on the approaching surface of the plug and a relatively inclined wall down which the lubricant can spread as it enters the groove formation, whereby such groove formation is adapted to interrupt some part of the lubricant on that portion of the plug immediately before such lubricant reaches the port in the socket, the means for lubricating said uninterrupted zone comprising a continuous groove in the surface of the plug located above and below said port.

8. A valve comprising a valve housing having a conical ported socket, a conical ported plug rotating in the conical ported socket, said socket and plug having complementary engaging surfaces, said plug having in its surface a continuous groove located above and below the ports for affording continuous lubrication in those areas, and said socket having a continuous groove around each port, those parts of the groove of the socket immediately in advance of the ports being shaped with a steep and inclined wall, the former facing the lubricant as it is carried around on the plug so as to scrape it off into the groove, those parts of the groove immediately in rear of the ports being similarly shaped and arranged in reverse disposition so that the inclined wall forms with the plug a wedge shaped space converging in the direction of rotation to cause lubricant to be drawn out of the groove by the plug and the intermediate parts of the groove serving to conduct the lubricant scraped off the plug by the first mentioned parts of the groove to the second mentioned parts of the groove.

FRANK METCALF ASPIN.